United States Patent [19]

Tustison

[11] Patent Number: 4,770,479
[45] Date of Patent: Sep. 13, 1988

[54] OPTICAL ELEMENTS HAVING BURIED LAYERS AND METHOD OF MANUFACTURE

[75] Inventor: Randal W. Tustison, Lexington, Mass.

[73] Assignee: Raytheon Company, Lexington, Mass.

[21] Appl. No.: 5,187

[22] Filed: Jan. 20, 1987

Related U.S. Application Data

[62] Division of Ser. No. 750,943, Jul. 1, 1985.

[51] Int. Cl.$^4$ .................... G02B 5/22; B32B 9/00; B32B 15/00; C03C 27/04
[52] U.S. Cl. .................... 350/1.6; 204/192.26; 350/1.7; 427/162; 427/250; 427/255; 428/622; 428/627; 428/632; 428/641; 428/658; 428/472; 428/698; 428/699; 428/702
[58] Field of Search ................ 350/1.6, 1.7, 166, 320, 350/1.1; 250/353; 428/621, 622, 627, 629, 632, 641, 642, 658, 471, 472, 698, 699, 701, 702; 427/162, 250, 255; 204/192.26

[56] References Cited

U.S. PATENT DOCUMENTS

| | | | |
|---|---|---|---|
| 4,057,316 | 1/1977 | Hacman et al. | 350/1.6 |
| 4,072,732 | 2/1978 | Kramer et al. | 428/699 |
| 4,114,978 | 9/1978 | Bostick et al. | 350/1.7 |
| 4,340,646 | 7/1982 | Ohno et al. | 350/320 X |
| 4,498,728 | 2/1985 | Thoni et al. | 350/166 |
| 4,645,290 | 2/1987 | Walsh | 350/1.7 |
| 4,662,653 | 5/1987 | Greenaway | 350/3.7 X |

FOREIGN PATENT DOCUMENTS

| | | | |
|---|---|---|---|
| 48-835 | 12/1974 | Japan | 204/192.26 |
| 54-121754 | 9/1979 | Japan | 350/1.7 |

OTHER PUBLICATIONS

"Sputtering," *McGraw-Hill Encyclopedia of Science and Technology*, New York: McGraw-Hill, 1982, vol. 13, p. 18.
"Reflection Filters and Coatings", Handbook of Optics, W. G. Driscoll et al., pp. 8-95 to 8-102.
"Silicon Dioxide as a High Temperature Stabilizer for Silver Films" by P. Hollingsworth Smith et al., Thin Solid Films, 45 (1977), pp. 159–168.
"The Physical and Optical Properties of Agglomerated Gold Films" by R. R. Zito et al., Thin Solid Films, 114 (1984), pp. 241–255.
"Interference Filters and Sets", Excerpt from Melles Griot, pp. 126–131.
Table of Refractory Materials, CRC Handbook of Chemistry and Physics, pp. D-51 to D-60.

*Primary Examiner*—John K. Corbin
*Assistant Examiner*—David J. Edmondson
*Attorney, Agent, or Firm*—Denis G. Maloney

[57] ABSTRACT

A buried conductive and/or reflective layer is provided in an optical element including at least one chemically vapor deposited material layer. Over a first layer of material is provided an intermediate region. The intermediate region in one embodiment includes at least one layer of a refractory-type material. In an alternate embodiment, the intermediate region is a composite intermediate region including a first passivating layer comprising a layer of a refractory-type of material such as one of the borides, carbides, nitrides, oxides and silicides, or a refractory-type of metal such as tungsten, molybdenum, tantalum, titanium and rhodium or a refractory-type of metal alloy. A conductive layer is then provided over at least a portion of the first passivating layer. Said conductive layer may comprise any one of the highly conductive/reflective metals such as copper, gold, silver, palladium, platinum and aluminum, for example. Over the conductive layer is provided a second passivating layer similarly comprising one of the aforesaid mentioned refractory-type of materials. A second layer of material is then chemically vapor deposited over the intermediate region. The single layer of refractory material provides an intermediate region having acceptable optical characteristics subsequent to chemical vapor deposition. The first and second passivating layers of the composite intermediate region isolates the conductive layer from the materials preventing interdiffusion and chemical reaction therebetween. Further, the second passivating layer protects the conductive layer from the generally corrosive and reducing or oxidizing environment provided during chemical vapor deposition of the second layer of material.

25 Claims, 3 Drawing Sheets

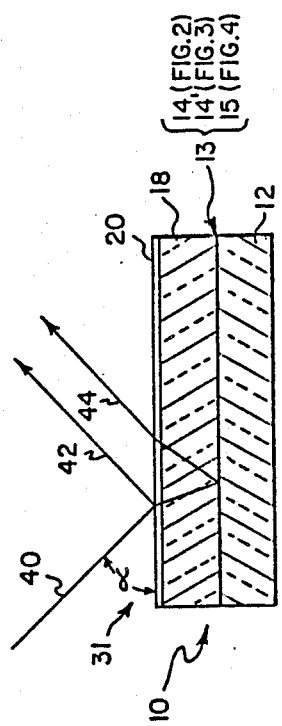
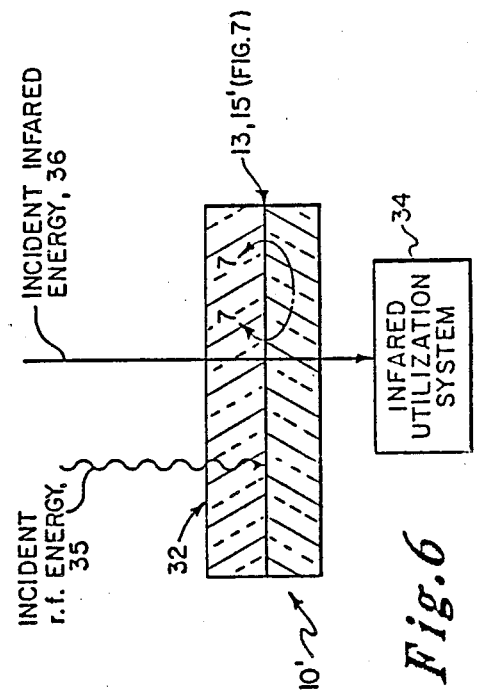
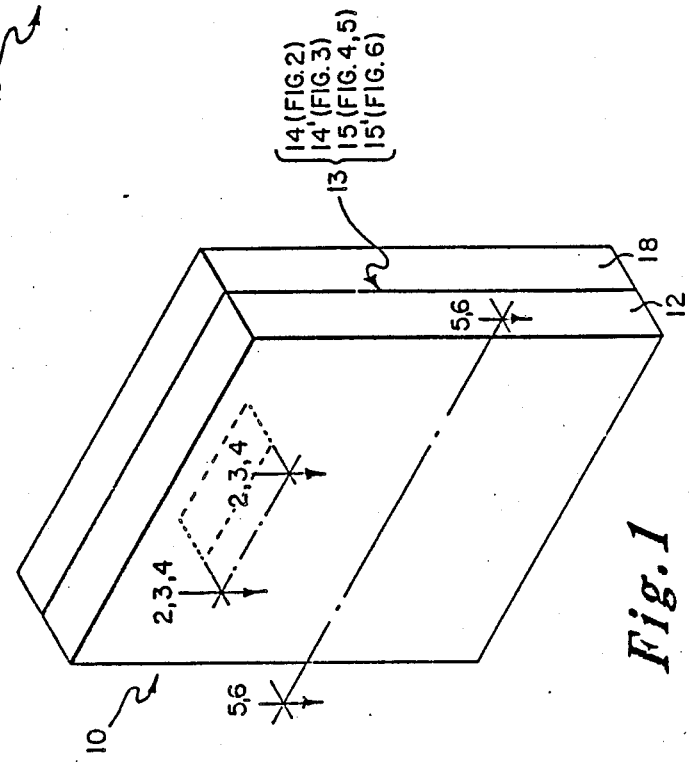

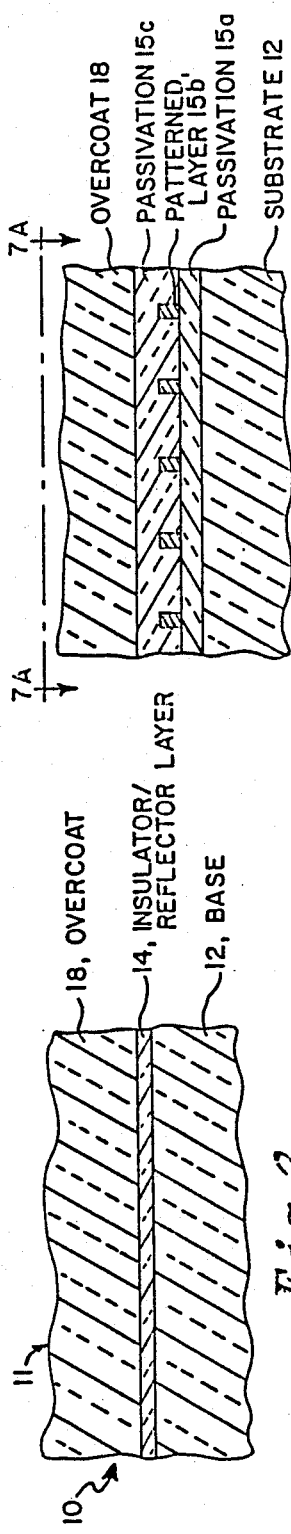
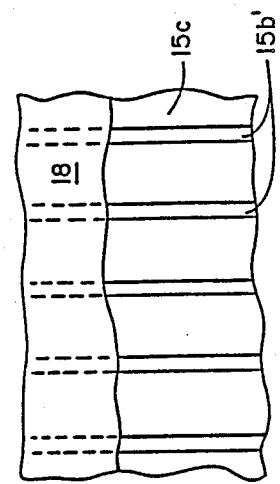
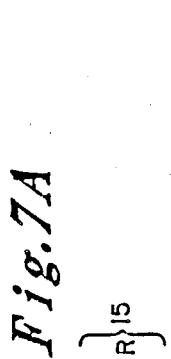
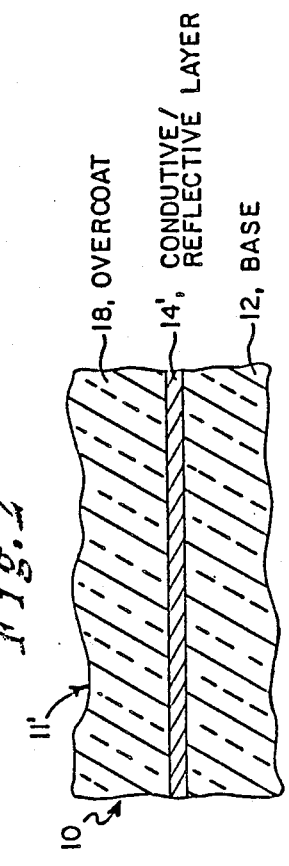
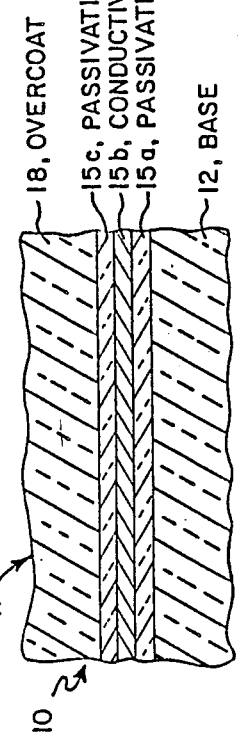

OPTICAL ELEMENTS HAVING BURIED LAYERS AND METHOD OF MANUFACTURE

The government has rights in this invention pursuant to Contract No. F29601-82-C-0103 under Subcontract 04-427856-UPT which was awarded by the Department of the Air Force.

This application is a divisional application of Ser. No. 750,943 filed July 1, 1985.

BACKGROUND OF THE INVENTION

This invention relates generally to optical elements, and more particularly, to infrared optical elements.

As is known in the art, optical elements and particularly infrared optical elements such as windows, domes and lenses are often comprised of material which is fabricated from a process known as chemical vapor deposition. The chemical vapor deposition (CVD) process generally includes the steps of directing reactant gases into a reactor vessel disposed at an elevated temperature and chemically reacting said gases to form the material. The material is deposited over a substrate to provide the particular optical element. The CVD process is generally a continuous process in which new reactant gases are introduced into the vessel and by-product gases and undeposited material vapors are vented. Generally, the combination of the reactants and by-product gases as well as the elevated temperatures provide a highly corrosive and possible chemically reducing or oxidizing environment.

It would be desirable in many applications to have optical elements having either layers or gratings buried within the optical element. Such layers or gratings may be used for heating to de-ice the optical element, provide electromagnetic shielding, or provide electromagnetic absorption. These layers may also be used to provide a surface reflective to one or more wavelength ranges of incident electromagnetic energy. Optical elements such as bandpass filters and, dichroic beam splitters which require a pair of surfaces reflectively responsive to different electromagnetic wavelengths, could be fabricated having one or more buried reflective layers.

Nevertheless, as mentioned above, when the optical element is fabricated by providing a chemical vapor deposited material over a reflective and/or conductive surface, the above-mentioned high temperature and chemically reducing environment generally will degrade the surface morphology of most of the highly reflective and/or conductive materials. Moreover, when layers of the highly reflective metals such as gold or silver are provided, the high temperature and corrosive environment or the chemical vapor deposition process generally causes the layer to agglomerate. When first deposited, these metals tend to have a mirror-like, smooth and hence reflective surface. However, during chemical vapor deposition, small islands of the material are formed leaving behind holes previously occupied by the material. Moreover, for some materials such as silver, total removal of the layer often occurs. This degradation in the surface morphology leads to reduced conductivity and/or reflectivity of the buried layers. Typically, high conductivity and/or reflectivity are the most important properties of these buried layers. Accordingly, buried layers comprising highly reflective and/or conductive materials are typically not found within optical elements fabricated from chemically vapor deposited materials.

SUMMARY OF THE INVENTION

In accordance with the present invention, an optical element includes a base layer, an intermediate layer disposed over said base layer comprising a refractory material, and an overcoat layer disposed over said intermediate layer comprising a layer of a compatible chemically vapor deposited material. The refractory material may comprise a refractory type of metal such as tungsten, molybdenum tantalum, titanium and rhodium or a refractory dielectric such as one of the borides, carbides, nitrides, oxides or silicides. The selection of the material of the refractory layer is determined by the desired optical properties of the element. For example, a refractory type of metal may be provided over the base layer and patterned to provide a heating grid to de-ice the optical element during operation. Alternatively, one of the foresaid refractory dielectrics may be chosen based upon optical properties which permit such a layer to be transparent br absorptive to electromagnetic energy of a first wavelength band and reflective to electromagnetic energy of a second, different wavelength band. With this arrangement, by providing the refractory layer sandwiched between the base layer and the chemically vapor deposited overcoat layer, an optical element is provided having an intermediate layer having a high degree of resistance to surface morphology degradation during chemical vapor deposition of the overcoat layer. With such high resistance to morphological change during chemical vapor deposition, the reflective and/or conductive properties of such layers are substantially unaffected by chemical vapor deposition of the overcoat layer. Furthermore, for certain materials such as the refractory type metals, the reflectance of layers of these materials may actually increase after chemical vapor deposition due to anneailing and grain growth of the layer during chemical vapor deposition of the overcoat layer.

In accordance with an alternate embodiment of the present invention, an optical element includes a first base layer, a composite intermediate layer comprising a first passivating layer of a refractory material disposed over said first base layer, a conductive layer disposed over said first passivating layer, and a second passivating, layer of a refractory material disposed over said conductive layer. The optical element further includes an overcoat layer comprising a chemically vapor deposited material disposed over the second passivating layer. With such an arrangment, the pair of passivating layers protect the conductive layer disposed therebetween from the reducing and corrosive environment generally encountered during chemical vapor deposition. Further, the passivating layers also protect the conductive layer from diffusion and reaction with the material of either the base layer or overcoat layer.

In accordance with a further aspect of the present invention, the pair of passivating layers comprise a refractory type of metal or a refractory dielectric. The refractory type of metal may include tungsten, molybdenum, tantalum, titanium and rhodium, as well as alloys of said metals, whereas, the refractory dielectric may include one of the borides, carbides, nitrides, oxides or silicides. More particularly, the refractory dielectric may include beryllium oxide, aluminum oxide, silicon dioxide, thorium oxide, yttrium oxide and zirconium oxide, the most preferred refractory dielectric being beryllium oxide. The passivating layers each have a thickness selected to completely isolate the conductive layer from the base layer and overcoat layer. The conductive layer may include a metal, more particularly, a refractory type of metal such as tungsten or one of the highly conductive metals such as copper, silver, gold, platinum and palladium or a metal such as aluminum. With such an arrangement, the refractory material comprising the passivation layers protects and isolates the conductive layer from the elevated temperature and chemically corrosive and potential reducing or oxidizing environment generally encountered during chemical vapor deposition of the overcoat layer. Furthermore, the passivating layers prevent reaction between and interdiffusion between the conductive layer and the material of the base and overcoat layers. Further still, with certain materials such as platinum and tungsten, for example, the reflectivity of the material over the wavelength range of 2 to 16 increases after chemical vapor deposition of the layer. It is believed that while the passivation layers prevent chemical reaction between the conductive layer and reactants present during chemical vapor deposition of the overcoat layer, the elevated temperatures present during growth of the overcoat layer cause the conductive layer to be annealed between the pair of passivating layers causing grain growth of the material of the conductive layer, thereby increasing the reflectivity of such layer above the reflectivity encountered prior to providing the overcoat layer.

In accordance with a further aspect of the present invention, a method of forming an optical element having a buried layer includes the steps of: providing a base layer, depositing an intermediate layer over a surface of said base layer, said intermediate layer comprising at least a first layer of at least a first refractory type of material, and chemically vapor depositing an overcoat layer over the intermediate layer. With such an arrangement, the refractory material is selected to withstand the high temperatures and chemically reducing environment encountered during chemical vapor deposition to provide a buried layer within the optical element. The intermediate layer may comprise a refractory type of metal such as tungsten (W), molybdenum (Mo), tantalum (Ta), titanium (Ti), rhodium (Rh) or refractory types of metals or a refractory type of dielectric such one of the borides, carbides, nitrides, oxides or silicides. The optical element can be fabricated having internal heating, shielding, absorption or reflection characteristics in accordance with the characteristics of the layer. Furthermore, if multiple layers are provided, the optical element may have selected band-type characteristics or combinations of the aforesaid characteristics.

In accordance with a still further aspect of the present invention, a method of forming an optical element having a buried passivated conductive layer includes the steps of: providing a base layer, depositing a composite intermediate layer over said base layer comprising consecutively deposited layers of a refractory material, a conductive material, and a second layer of a refractory material, and chemically vapor depositing an overcoat layer over the second layer of the refractory material. With such an arrangement, the refractory materials are selected to withstand the high temperatures and chemically reducing environment encountered during chemical vapor deposition of the overcoat layer, thus protecting the conductivity and reflectivity of the conductive layer.

BRIEF DESCRIPTION OF THE DRAWINGS

The foregoing features of this invention, as well as the invention itself, may be more fully understood from the following detailed description of the drawings, in which:

FIG. 1 is an isometric view of an optical element, here a plate including a base layer, an intermediate layer and an overcoat layer;

FIG. 2 is a cross-sectional view taken along line 2—2 of FIG. 1 showing the intermediate layer comprising a buried dielectric layer in accordance with one aspect of the present invention;

FIG. 3 is a cross-sectional view taken along line 3—3 of FIG. 1 showing the intermediate layer comprising a buried conductive layer in accordance with an additional aspect of the present invention;

FIG. 4 is a cross-sectional view taken along line 4—4 of FIG. 1 showing the intermediate layer comprising a composite intermediate layer including a conductive/reflective layer disposed between a pair of passivation layers in accordance with a further aspect of the present invention;

FIG. 5 is a cross-sectional view taken along line 5—5 of FIG. 1 showing a composite intermediate layer including a conductive/reflective layer disposed between a pair of passivation layers and a dichroic reflective coating disposed over a surface of the overcoat layer in accordance with a still further aspect of the present invention;

FIG. 6 is a cross-sectional view taken along line 6—6 of FIG. 1 showing a composite intermediate layer including a patterned layer disposed between a pair of passivating layers in accordance with a still further aspect of the present invention;

FIG. 7 is an exploded cross-sectional view taken along line 7—7 of FIG. 6;

FIG. 7A is a plan view of FIG. 7;

DESCRIPTION OF THE PREFERRED EMBODIMENTS

Figure 8:
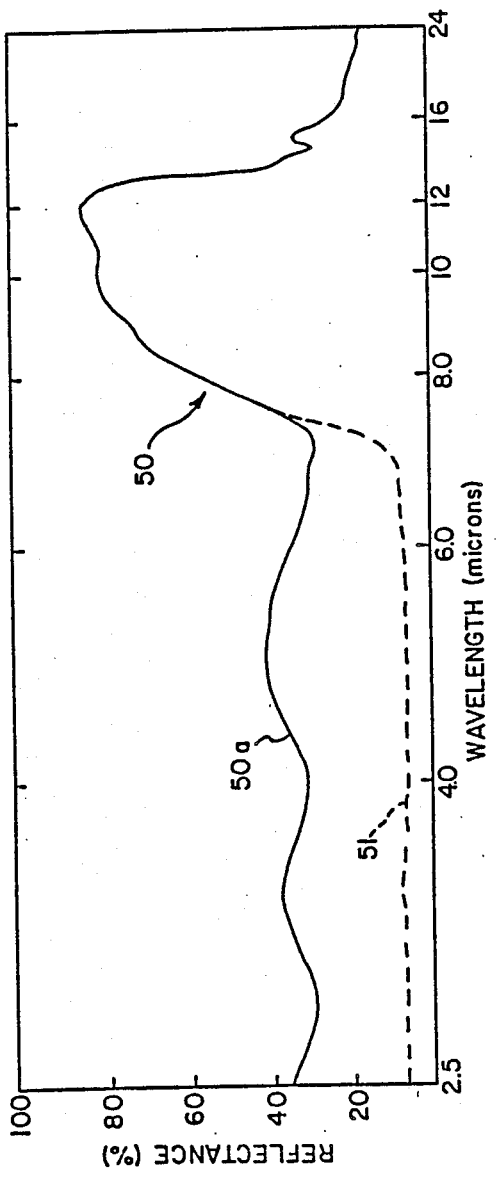
FIGS. 8-9 are graphs of percent reflectance vs. wavelength for various types of buried layers.

Referring now to FIG. 1, here an optical element 10 is shown to include a pair of layers 12, 18, each comprising a material having selected electromagnetic and in particular optical properties. The optical element 10 further includes an intermediate region 13 disposed or sandwiched between layers 12 and 18. Intermediate region 13 may have one of several different types of construction in accordance with the function of the optical element 10 as will be described in conjunction with FIGS. 2-6. Suffice it here to say, however, that the optical element 10 may be, for example, an optical window 11 having a selectively reflective dielectric layer 14 (FIG. 2), an optical window 11' having a conductive/reflective layer 14' (FIG. 3), an optical window 11" having a buried composite layer 15 (FIG. 4), a plate-type dichroic beam splitter 31 (FIG. 5) having the buried reflective dielectric layer 14 (FIG. 2) or the buried conductive reflective layer 14' (FIG. 3), or an rf absorbent, infrared transparent window 32 having a buried composite layer 15' including a patterned rf absorbent layer 15b' (FIG. 5). Further, the optical element may also be any of other types of elements such as a lens, mirror, filter, polarizer, prism or the like.

In any event, here the optical element 10 includes the first substrate or base layer 12 preferably comprising a chemically vapor deposited material. The intermediate layer 13 here comprises either a single dielectric/reflective layer 14 (FIG. 2A), a single conductive/reflective layer 14' (FIG. 2B), a composite layer 15 (FIGS. 3 and 4) comprising a conductive layer disposed between a pair of passivating layers 15a, 15b (FIG. 4) or a composite layer 15' (FIGS. 6, 7, 7A) having a patterned conductive layer 15b' disposed between a pair of passivating layers 15a, 15c'. The second or overcoat layer 18 is here comprised of a chemically vapor deposited material and is deposited over the intermediate layer 13 to provide the optical element 10. The material of substrate or base layer 12 and substrate or overcoat layer 18 each comprises any suitable optical material preferably comprised of a chemically vapor deposited material. The chemically vapor deposited material is characterized by having an actual density substantially equal to 100% of the theoretical density of the material, is substantially pore-free, substantially stress-free and is generally optically transmissive to electromagnetic energy having wavelengths up to typically 30 microns. Furthermore, layers of the chemically vapor deposited material typically have thicknesses in excess of 25 microns, although layers having smaller thicknesses may be fabricated. Examples of suitable chemically vapor deposited materials having known optical characteristics include zinc sulfide (ZnS), zinc selenide (ZnSe), gallium arsenide (GaAs), mercury cadmium telluride (HgCaTe), germanium (Ge), silicon (Si), gallium phosphide (GaP), aluminum oxynitride ($Al_3ON_2$) (ALON), yttrium oxide ($Y_2O_3$), magnesium oxide (MgO). Other suitable materials nevertheless may alternatively be used in accordance with this invention. Fabrication of particular examples of optical elements 10 will now be described in conjunction with the cross-sectional views of FIGS. 2-6.

Referring first to FIG. 2, optical element 10 (FIG. 1), here a filter element 11 is shown to comprise a base layer 12, here comprising one of the aforesaid mentioned optically transmissive materials which is preferably a material formed by chemical vapor deposition. The reflective layer 14, here comprises a refractory material which is substantially chemically inert during chemical vapor deposition (CVD) of overcoat layer 18, and has a relatively high melting point temperature, typically in excess of the temperature encountered during CVD. Furthermore, the refractory material should have optical and physical properties which are compatible with the material of base layer 12, and the overcoat layer 18 (as will be described hereinafter). Further, the refractory material should have properties which are compatible with the application or function of the optical element. Also, after fabrication, the refractory material should be chemically inert and hence chemically compatible with the materials of layers 12 and 18. The reflective layer 14 is here comprised of a refractory material, more particularly, either a refractory-type of metal (as will be described in conjunction with FIG. 3) or a refractory dielectric as will now be described.

The refractory dielectric comprising the reflective layer 14 is here sputtered over the base layer 12. Alternatively, the layer 14 may be deposited by other known techniques and optionally may be patterned. The material is typically deposited to a thickness generally exceeding 1 micron. The reflective layer 14 is here comprised of a refractory material, more particularly, at least one material selected from the group consisting of the borides, carbides, nitrides, oxides or silicides. More particularly, the refractory material may comprise a material having such refractory characteristics and further a material which exhibits the so-called "residual ray" or "Reststrahlen effect." Thus, materials having predetermined known spectral properties may be used as the layer to provide optical elements having filtering and, in particular, bandpass filtering characteristics. Examples of suitable materials are listed in *The Handbook of Optics*, by W. G. Driscoll, Editor, McGraw-Hill Book Company, New York, N.Y., pp. 8-97, Table 4. When layer 14 is selected to be a continuous layer of one of the aforesaid mentioned Reststrahlen effect materials, the optical window 11 may have band pass/band reject filter characteristics. For example, beryllium oxide BeO is substantially transparent to electromagnetic energy having a wavelength of less than about 7 microns, is reflective over a range of about 7 to 13 microns, and is absorptive for wavelengths greater than about 13 microns. Accordingly, by providing a single layer 14 comprising beryllium oxide, a band pass/reject filter is provided which is substantially reflective of relatively long wave infrared electromagnetic (LWIR) energy and is substantially transparent to short wavelength infrared and visible electromagnetic energy.

An example of the optical element 11 described in conjunction with FIG. 2 was fabricated having the single dielectric reflective layer. The dielectric layer was ion sputtered over the base layer 12. However, other suitable deposition techniques for the dielectric layer 14 may alternatively have been used.

Material of Layers 12, 18: ZnSe
Deposition Temperature of Layer 18: 700° C.
Thickness of layers 12, 18: 0.200 inches.

TABLE 1

| Example No. | Material of Layer 14 | Thickness | % R |
| --- | --- | --- | --- |
| 1 | BeO | 2.8 microns | FIG. 8 curve 50 |

The percent reflectance (%R) is shown in FIG. 8 curve 50. For the range of 9.5 to 13 microns, the percent reflectance is at least 80%. Measurements of percent reflectance were taken through the overcoated layer 18 of ZnSe as reflected from the reflective layer 14. A Perkin-Elmer spectrophotometer, Model 580-B was used to take the measurements using the front side mirror surface of an aluminum plate as a reference. The varying level of reflectance below about 7.0 microns, curve region 50a, is due to two effects. The d.c. type level at about 30%R is due to the high index of refraction of ZnSe, and the sinusoid type of variation is the result of interference patterns created by the ZnSe and BeO interface. This level could be reduced, typically, to the level shown by phantom line 51 by a suitable conventional broadband antireflection coating over the overcoat layer 18.

Referring now to FIG. 3, an optical element 10 (FIG. 1) here a window 11' is shown to include the base layer 12 comprising one of the aforesaid materials and a conductive layer 14' comprising a refractory type of metal such as tungsten (W), molybdenum (Mo), tantalum (Ta), rhodium (Rh), titanium (Ti) and other refractory types of metals. Refractory alloys of such metals, as well as, multiple layers of any of said metals may also be used. The refractory-type metal is deposited preferably sputtered over the base layer 12 to provide the conductive layer 14'. The overcoat layer 18 is then chemically vapor deposited over the conductive layer 14' without any significant degradation in the surface morphology of the layer. Such a layer 14' may be patterned prior to depositing of the overcoat layer 18 to provide a conductive array for heating of the optical element 10, for example. Accordingly, when layer 14' is fabricated to be a patterned metallic layer, suitable power supply means (not shown) may be attached to said layer to provide the optical element having an internally disposed heating arrangement. Such element may be used as an infrared window, for example, having a de-icing capability and, accordingly, would prevent defraction and reflection of incident infrared energy upon said window. Alternatively, the layer 14' may be continuous and used as a reflective layer.

Examples of the optical element class described in conjunction with FIG. 3 were fabricated having the single conductive/reflective layer 14'Examples in which the conductive/reflective layer was "masked" had a conductive/reflective layer disposed only over central portions of the base layer and with the overcoat layer disposed over peripheral portions of the base layer and the conductive/reflective layer. All other examples have the conductive/reflective layer disposed over peripheral and central portions of the base layer.

Material of layers 17, 18: ZnSe
CVD Deposition Temperature for layer 18: 700° C.
Thickness range of layers 12, 18: 0.1 in. to 0.2 in.

TABLE 2

| Example No. | Material of Layer 14 | Thickness (Å) | Initial % R @ 10μ | % R after overcoat @ 10μ |
|---|---|---|---|---|
| 2 | Pt | 800 | 83 | 62 |
| 3 | Pt | 1000 | 85 | 54 (curve 34) |
| 4 | Pt | 1000 (masked) | 85 | 54 |
| 5 | Mo | 750 | 46 | 67 |
| 6 | W | 1000 | N/A | 72 |
| 7 | Pt | 1500 | 87 | 56.5 |
| 8 | Pt | 1500 (masked) | 87 | 53.5 |
| 9 | Mo | 1000 | 43 | 59.5 |
| 10 | Mo | 1000 | 43 | 56.8 |
| 11 | Mo | 1500 | 41 | 56.2 |
| 12 | Mo | 1500 | 41 | 58 |

For a conductive layer comprising refractory types of metals such as Mo and W, %R is typically 40-60% prior to overcoat with ZnSe. It is believed that the low initial % R was partially due to oxidation of the films during evaporation. Sputtered films or more carefully deposited evaporated films may have had a higher initial %R and thus a higher %R after CVD. As shown in Table 2, the %R was enhanced after CVD of overcoat layer 18 for refractory metals such as Mo and W. It is believed that this increase was a result of grain growth, annealling and possible chemical reduction of the refractory metal layer.

The percent reflectance (%R) is shown in FIG. 9A, curve 61 for the Pt layer prior to the overcoat of zinc selenide and curve 62 subsequent to having overcoat layer 18 deposited thereon. As can be seen, %R is reduced between 30-40% after overcoat of ZnSe.

TABLE 3

| Example No. | Material of layer 14' | Thickness (Å) | Initial % R @ 10μ | % R after overcoat @ 10μ |
|---|---|---|---|---|
| 13 | V | 750 | 75 | 17.5 |
| 14 | Pd | 2000 | 88 | 23 |
| 15 | Cr | 800 | 73 | 18.5 |

TABLE 3-continued

| Example No. | Material of layer 14' | Thickness (Å) | Initial % R @ 10μ | % R after overcoat @ 10μ |
|---|---|---|---|---|
| 16 | Au/Cr | 523Å/60Å | 97 | 22.5 |

As shown in Table 3, less refractory types of metals such as Pd, V and Cr, as well as, a Cr/Au alloy were unsuccessful at 700° C. temperature. However, for other CVD materials besides ZnSe or lower deposition temperatures for ZnSe, these materials may provide a higher post overcoat percent reflectance (%R).

A second class of windows 11' were fabricated comprising zinc sulfide.
Material of layers 12, 18: ZnS
Deposition Temperature for layer 18: 700° C.
Thickness range for layers 12, 18: 0.125 in.

TABLE 4

| Example No. | Material of Layer 14 | Thickness Å | % R after overcoat @ 10μ |
|---|---|---|---|
| 17 | Mo (patterned) | 1000 | >85% |

As is shown in Table 4, the % reflectance for a buried Mo layer is in excess of 85%. Again, this %R is actually higher for Mo over this wavelength range than the initial %R for Mo prior to the overcoat layer being deposited.

Referring now to FIG. 4, a second optical element 10, here an infrared window 11", is shown to include the substrate or base layer 12, a composite intermediate layer 15, and the second or overcoat layer 18, here layers 12 and 18 each comprising a chemically vapor deposited material. Here the composite layer 15 includes a conductive/reflective layer 15b disposed between a pair of passivating layers 15a, 15c, as shown. Passivation layers 15a and 15c are selected to substantially prevent diffusion or reaction between either the base layer 12 or the overcoat layer 18 and the conductive/reflective layer 15b. Further, passivation layer 15c is also provided to isolate the conductive/reflective layer 15b from the generally chemically reducing or oxidizing and corrosive environment provided during chemical vapor deposition of the overcoat layer 18. Accordingly, the thicknesses of layers 15a and 15c are determined by the minimum thicknesses at which the layers are continuous and free of pinholes and other defects so that the sandwiched conductive layer 15b is substantially or preferably completely isolated from the base and overcoat layers 12, 18. Although the thickness of the layer must have a minimum thickness of typically 50Å to act as passivation layers, generally, they should for many applications have a maximum thickness not exceeding 1000Å to prevent the optical characteristic of the passivating layers 15a, 15c from dominating over or superseding the optical characteristic of the conductive layer 15b. Passivation layers 15a and 15c may comprise one of the aforesaid mentioned refractory materials, such as one of the borides, carbides, nitrides, oxides or silicides. More particularly, the material may comprise a material such as BeO, $AL_2O_3$, $SiO_2$, $ThO_2$, $Y_2O_3$ or $ZrO_2$, with BeO here being the preferred material. Further, certain refractory-type metals having a relatively high melting temperature and high corrosion resistance, such as W, Mo, Ta, Ti and Rh may also be used, as well as, certain metal alloys having such properties. The conductive/reflective layer may comprise a metal such as one of the aforesaid refractory metals and preferably a metal such as aluminum (AL) or one of the highly conductive/reflective metals, such as copper (Cu), silver (Ag), gold (Au), platinum (Pt) and palladium (Pd). Here platinum is the preferred metal for conductive/reflective layer 5b. Platinum has a higher resistance fo agglomeration than the other so-called highly conductive/reflective metals and has a higher (%R), in particular, for optical energy having a wavelength less than about 18 microns, than the so-called refractory type metals.

Examples of an optical element 11" having composite intermediate layer 15 were fabricated Each element included the base 12 of zinc selenide, a passivation layer 15a, a conductive/reflective layer 15b, a second passivation layer 15c, and an overcoat layer 16 comprising a layer of zinc selenide. The composite layer 15 is provided by sputtering the first passivating layer, the metallic reflective layer and the second passivating layer over the base layer. After the passivating 15c is provided, the overcoat layer 18 is chemically vapor deposited over the passivation layer 15c.

TABLE 5

Layers 12, 18 ZnSe;
Layer 18 deposited @ 700° C.
Thickness of Layers 12, 18 0.1 to 0.2 inches

| Example No. | material/thickness | | | % R reflectance after overcoat @ 10μ |
|---|---|---|---|---|
| | Layer 15a (Å) | Layer 15b (Å) | Layer 15c (Å) | |
| 18 | Mo 300 | Pd 1000 | Mo 300 | 68 |
| 19 | Mo 300 | Au 1000 | Mo 300 | 56 |
| 20 | BeO 1000 | Pt 2000 | BeO 1000 | 88 |
| 21 | BeO 1000 | Pt 1000 | BeO 1000 | 94 |
| 22 | BeO 500 | Pt/W 1000Å (50/50 Atomic %) | BeO 500 | 92 |
| 23 | W 150 | Pt 1000 | W 150 | 87 |

Figure 9:
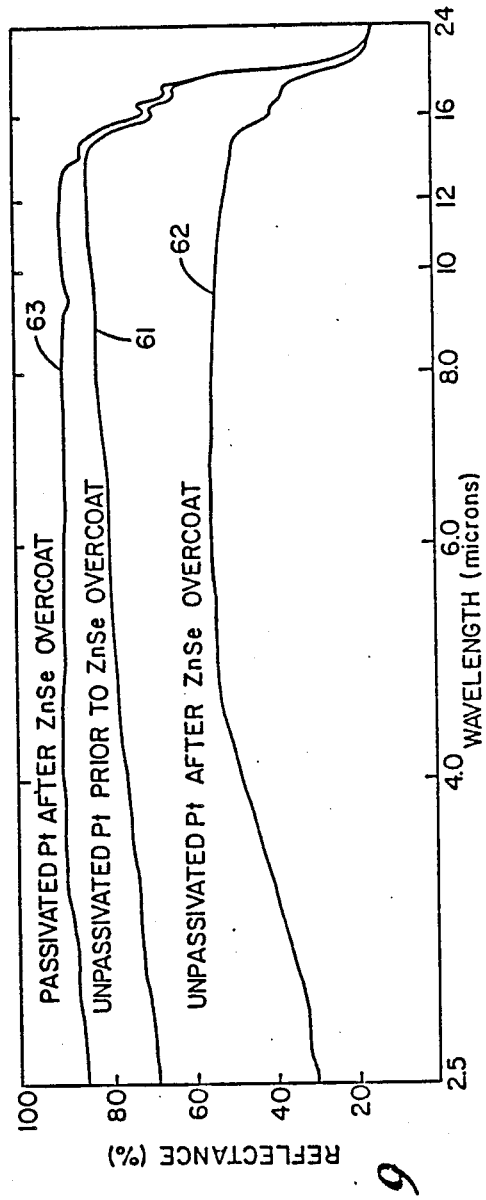

As previously described in conjunction with Table 2 and FIG. 9 curves 61-62, if Pt alone is deposited and then overcoated or buried within zinc selenide, there is a 30 to 40 percent decrease in the initial reflectivity of the Pt layer over the wavelength of range of 2-14 microns. Accordingly, the single, unpassivated Pt layer provides a relatively poor reflective/conductive layer. However, as also shown in FIG. 9 curve 63, if the platinum film 15b is passivated on both sides by passivating layers 15a, 15c, the reflectivity of the platinum is typically in excess of 90 percent at wavelengths between 8-12 microns. That is, the reflectivity of the passivated platinum layer buried between the pair of zinc selenide layers 12, 18 is actually higher than the reflectivity of the platinum layer prior to deposit of the second passivating layer as shown in FIG. 9 curve 61. It is believed that this increase in reflectivity of platinum layer 15 after the passivation layer 15c and overcoat layer 18 are deposited, results from annealing and grain growth of the platinum layer 15b between the passivation layers at the elevated temperatures occurring during chemical vapor deposition of the zinc selenide.

Referring now to FIG. 5, a plate-type dichroic beam splitter 31 is shown to include the base layer 12, an intermediate region 13 here comprising a reflective layer 14', as described in conjunction with FIG. 3, or a composite layer 15 as described in conjunction with FIG. 4, the overcoat layer 18 here comprising a suitable chemically vapor deposited material, here of zinc selenide, and a dichroic reflective coating 20 deposited over a surface of the overcoat layer 18, as shown. An incident beam 40 of optical electromagnetic energy impinges upon the dichroic reflective coating 20 at an incident angle α of nominally 45°. Here the incident energy represented by ray 40 includes high intensity radiation from a $CO_2$ laser (not shown), for example, and low intensity incoherent long wavelength infrared radiation (LWIR). The coating is selected to be substantially totally reflective of the high intensity $CO_2$ laser energy and substantially totally transparent to the incoherent LWIR energy. A first ray 42 representative of the high intensity energy from the $CO_2$ laser is reflected off the surface of the dichroic reflective coating 20. The remaining portion of said incident radiation, here the incoherent LWIR radiation propagates through the dichroic coating and overcoat layer 16, and is reflected at the surface of the buried reflective layers 14' or 15. The reflected energy will propagate back through the overcoat layer 18 and coating 20 emerging from the beam splitter as ray 44. Thus, dichroic beam splitter 31 separates or splits incident high intensity $CO_2$ laser energy from low intensity incoherent LWIR energy. Other elements such as cubic beam splitters or intermediate layers having a Fresnel structure, a prism or a reflective layer having a surface not parallel with the surface of the dichroic coating may be used to provide additional angular separation of the incident energy.

Referring now to FIGS. 6, 7 and 7A, an infrared detection system 35 (FIG. 6) is shown to include an infrared window 32 and an infrared utilization system 34. Incident infrared electromagnetic energy is provided through the infrared window 32 to be utilized by the infrared utilization system 34 in a known manner. Further, RF energy 35 may be incident upon the infrared window 32 from a distant emitter (not shown). The incident RF energy 35 may be either reflected by the infrared window as described in conjunction with FIGS. 3, 4 or will be absorbed by the infrared window 32 as will now be described. The infrared window 32 is shown to include the base layer 12, here comprising a chemically vapor deposited material, here zinc selenide and a patterned composite layer 15'. As shown in FIGS. 7, 7A, the composite layer 15' includes the first passivating layer 15a disposed over the substrate layer 12, a patterned, conductive layer 15b' disposed over the passivating layer 15a and a second passivating layer 15c', here disposed over and between the underlying patterned metallic layer 15b', as shown. The patterned metallic layer 15b' may be used for heating the infrared window for deicing purposes, as well as, providing absorption of incident radio frequency energy 34 incident upon the window 31'. The conductive layer 15b is deposited over the passivating layer 15a and is then masked and patterned using conventional techniques to provide a plurality of here spaced conductors 15b''.

Here each of said conductors are spaced by a distance substantially greater than several hundred or thousand wavelengths of the corresponding incident optical energy. With such an arrangement, the conductors will be spaced relatively closely for incident r.f. energy and such energy will be absorbed, whereas, the conductors will be spaced relatively far apart compared to the wavelength of the incident optical energy and accordingly the conductive layer 15b' will be transparent to such optical energy.

Having described preferred embodiments of the present invention, it will now be apparent that other embodiments incorporating its concept may be used. It is felt, therefore, that this invention should not be limited to the disclosed embodiment, but rather should be limited only by the spirit and scope of the appended claims.

What is claimed is:

1. An infrared optical element comprising:
   a base comprising an optically transmissive material having a thickness of at least about 0.1 inches, said material having a relatively high percent transmittance to optical energy within at least a portion of the wavelength band of about 2 microns to 30 microns;
   an intermediate region disposed on at least a portion of the base comprising a refractory type of material; and
   an overcoat disposed on the intermediate region comprising an optically transmissive substantially stress-free material having an actual density substantially equal to 100% of the theoretical density of said material and a thickness substantially greater than about 25 microns, said material having a relatively high percent transmittance to optical energy within at least a portion of the wavelength band of about 2 microns to 30 microns.

2. The optical element of claim 1 wherein said refractory material of said intermediate region is selected from the group consisting of molybdenum, tungsten, tantalum, titanium and rhodium.

3. The optical element of claim 2 wherein said base and overcoat material are selected from the group consisting of ZnS and ZnSe and wherein said intermediate region has a percent reflectivity of at least 50% to electromagnetic energy incident upon a surface of the overcoat layer having a wavelength within the range of 2 microns to 14 microns when measured as reflected from the intermediate region through the overcoat.

4. The optical element of claim 3 wherein said base material is substantially stress-free and has an actual density substantially equal to 100% of the theoretical density of the material.

5. The optical element of claim 24 wherein said intermediate layer has a percent reflectivity of at least 70% to electromagnetic energy incident upon a surface thereof, through a selected one of the base and the overcoat, having a wavelength within a first portion of the wavelength band of 2 microns to 30 microns and second predetermined percent reflectivity substantially less than 30% to incident electromagnetic energy incident upon the surface thereof, through the selected one of the base and the overcoat, having a wavelength outside of the first portion of the said wavelength band.

6. The optical element of claim 5 wherein said base and overcoat layer is zinc selenide.

7. The optical element of claim 2 wherein said base and overcoat layer are selected from the group consisting of silicon, germanium, a Group III-V material, aluminum oxynitride, zinc sulfide, zinc selenide, yttrium oxide and magnesium oxide.

8. The optical element of claim 1 wherein said refractory material of said intermediate region is selected from the group consisting of the borides, carbides, nitrides, oxides and silicides.

9. The optical element of claim 8 wherein said base and overcoat layer are selected from the group consisting of silicon, germanium, a Group III-V material, aluminum oxynitride, zinc sulfide, zinc selenide, yttrium oxide and magnesium oxide.

10. An optical element comprising:
    (a) a base comprising an optically transmissive material, with said material being substantially stress-free, having a density substantially equal to 100% of theoretical density of the material and said base having a thickness greater than about 0.1 inches;
    (b) a composite intermediate region disposed over at least a portion of the base comprising:
        (i) a first layer of a refractory material disposed over the base layer having a first predetermined thickness;
        (ii) a layer of a conductive material disposed on the first refractory layer; and
        (iii) a second layer of a second refractory material having a second predetermined thickness disposed on the conductive layer;
    (c) an overcoat disposed on the second passivating layer comprising an optically transmissive material, said material being substantially stress-free having a density substantially equal to 100% of the theoretical density of said material and a thickness greater than about 25 microns, whereas said first and second predetermined thickness are selected to provide layers which are continuous and free from defects to isolate the layer of conductive material from the base and overcoat layers.

11. The optical element of claim 10 wherein each of said refractory materials are selected from the group consisting of tungsten, molybdenum, tantalum, titanium, and rhodium, and said conductive layer is selected form the group consisting of tungsten, molybdenum, copper, gold, silver, platinum, palladium and aluminum.

12. The optical element of claim 11 wherein said conductive layer is selected from the group consisting of palladium, gold, and platinum, and the composite intermediate region has a percent reflectivity of at least 50% to electromagnetic energy having a wavelength less than about 30 microns incident upon a selected one of the base and the overcoat when measured as reflected through the overcoat.

13. The optical element of claim 11 wherein said conductive layer is platinum and the composite intermediate region has a percent reflectivity of at least 80% to electromagnetic energy having a wavelength less than about 30 microns incident upon a selected one of the base and the overcoat when measured as reflected through the selected one of the base and the overcoat.

14. The combination of claim 10 wherein the refractory material of said first and second passivating layers comprises a material selected from the group consisting of the borides, carbides, nitrides, oxides and silicides and the conductive layer comprises a metal selected from the group consisting of tungsten, molybdenum, copper, gold, silver, palladium, platinum and aluminum.

15. The optical element of claim 5 wherein said conductive layer is selected from the group consisting of palladium, gold, platinum and the refractory material is selected from the group consisting of BeO, $Al_2O_3$, $SiO_2$, $ThO_2$, $Y_2O_3$, and $ZrO_2$ and said composite intermediate region has a percent reflectivity of at least 50% to electromagnetic energy having a wavelength of less than about 30 microns incident upon a selected one of the base and the overcoat when measured as reflected through the selected one of the base and the overcoat.

16. The optical element of claim 14 wherein said conductive layer is platinum and refractory material is BeO and said composite intermediate region has a percent reflectivity of at least 80% to electromagnetic energy having a wavelength of less than about 30 microns incident upon a selected one of the base and the overcoat when measured as reflected through the selected one of the base and the overcoat.

17. The optical element of claim 16 wherein said composite intermediate region has a percent reflectivity of at least 90% to electromagnetic energy having a wavelength less than about 30 microns incidents upon a selected one of the base and the overcoat when measured as reflected through the selected one of the base and the overcoat.

18. An optical element comprising:
a base having a thickness of at least about 0.1 inches comprising an optically transmissive material selected from the group consisting of zinc sulfide and zinc selenide provided by chemical reacting vapors to form the material;
an intermediate region disposed on at least a portion of the base comprising a refractory type of material; and
an overcoat disposed on the intermediate region comprising an optically transmissive substantially stress-free material selected form the group consisting of zinc sulfide and zinc selenide provided by chemically reacting vapors over the intermediate region and base to form the material over said intermediate region and base, said material having an actual density substantially equal to 100% of the theoretical density of said material and a thickness substantially greater than about 25 microns.

19. The optical element of claim 18 wherein said refractory material of said intermediate region is selected from the group consisting of molybdenum, tungsten, tantalum, titanium and rhodium.

20. The optical element of claim 19 wherein said intermediate region has a percent reflectivity of at least 50% to layer and having wavelength within the range of 2 microns to 14 microns when measured as reflected from the intermediate region through a selected one of the base and overcoat.

21. The optical element of claim 20 wherein said base material is substantially stress-free and has an actual density substantially equal to 100% of the theoretical density of the material.

22. The optical element of claim 21 wherein said base and overcoat layer is zinc selenide.

23. The optical element of claim 18 wherein said refractory material of said intermediate region is selected from the group consisting of the borides, carbides, nitrides, oxides and silicides.

24. The optical element of claim 23 wherein said intermediate layer has a percent reflectivity of at least 70% to electromagnetic energy incident upon a surface thereof, through a selected one of the base and the overcoat, having a wavelength within a first portion of the wavelength band of 2 microns to 30 microns and second predetermined percent reflectivity substantially less than 30% to incident electromagnetic energy incident upon the surface thereof, through the selected one of the base and overcoat, having a wavelength outside of the first portion of the said wavelength band.

25. The optical element of claim 24 wherein said base and overcoat layer is zinc selenide.

* * * * *